United States Patent

Grobecker et al.

[11] Patent Number: 6,053,311
[45] Date of Patent: Apr. 25, 2000

[54] HOUSING FOR ACCOMMODATING DISC-SHAPED INFORMATION CARRIERS

[75] Inventors: Hermann Grobecker, Garbsen; Henning Wilhelm, Lehrte/Aligse, both of Germany

[73] Assignee: U.S. Philips Corporation, New York, N.Y.

[21] Appl. No.: 08/795,494

[22] Filed: Feb. 5, 1997

[30]  Foreign Application Priority Data

Feb. 14, 1996 [DE] Germany .......................... 196 05 336

[51] Int. Cl.[7] .................................................. B65D 85/57
[52] U.S. Cl. ........................................ 206/308.1; 206/311
[58] Field of Search ................................. 206/308.1, 310, 206/311

[56] References Cited

U.S. PATENT DOCUMENTS

| | | | |
|---|---|---|---|
| 4,535,888 | 8/1985 | Nusselder | 206/311 |
| 5,246,107 | 9/1993 | Long et al. | 206/311 |
| 5,269,409 | 12/1993 | Brandt et al. | 206/311 |
| 5,284,248 | 2/1994 | Dunker | 206/308.1 |
| 5,322,162 | 6/1994 | Melk | 206/308.1 |
| 5,558,220 | 9/1996 | Gartz | 206/310 |
| 5,590,767 | 1/1997 | Li | 206/308.1 |

FOREIGN PATENT DOCUMENTS

0114631B1  8/1984  European Pat. Off. .

*Primary Examiner*—Jim Foster
*Attorney, Agent, or Firm*—Leroy Eason

[57] ABSTRACT

A housing for storing disc-shaped information carriers, for example CD's, has a central part (14), two identical lid parts (10, 11), and a support plate (15) which extends from the central part and is situated between the lid parts. In order to increase the available space within the housing, the support plate (15) is flat on both sides and is asymmetrically positioned between the lid parts (10, 11) so as to form two spaces (17, 18) of different sizes between the lid parts and opposite sides of the support plate. Such spaces can accommodate information leaflets of different thickness.

8 Claims, 4 Drawing Sheets

HOUSING FOR ACCOMMODATING DISC-SHAPED INFORMATION CARRIERS

BACKGROUND OF THE INVENTION

1. Field of the Invention

The invention relates to a housing for accommodating disc-shaped information carriers, for example CDs, with a central part comprising a support plate and two identical lid parts hinged to the central part, which lid parts are capable of having one retaining device each for the information carriers on the inside, while the central part is capable of having one such device on both sides.

2. Description of the Related Art

Such a housing is known, for example, from EP-PS 0 114 631, which corresponds to U.S. Pat. No. 4,535,888, issued Aug. 20, 1985. This known housing is a CD packaging for several CDs which has been standardized worldwide. A maximum of four CDs can be accommodated in such a known packaging. The lid parts here each have a retaining device on their inside for holding one CD each, while in addition the central part has a retaining device on either side for accommodating a further two CDs. In commercially available housings usual in practice, the retaining devices of the central part are centrally positioned on a support plate which is provided with a raised central support on either side and is curved and provided with raised reinforcement ribs in radial direction away from the central support, so that this support plate occupies comparatively much space perpendicular to its plane. The distance between the end faces of the retaining devices on either side of the support plate is so small that at most a thin text leaflet can be accommodated between the retaining devices. Such a housing, however, usually contains four CDs which are accompanied by a correspondingly thick text booklet. It has been impossible until now to accommodate such a booklet inside the housing for the reasons mentioned above, instead, this comparatively thick text booklet was offered together with the housing in a separate box, for example made of cardboard.

SUMMARY OF THE INVENTION

The invention has for its object to the known, commercially available housing of the kind mentioned above such that the useful interior space is increased and can be better utilized, while the exterior dimensions of the housing remain unchanged.

According to the invention, this object is achieved in that the support plate is made flat on both sides and is arranged in an asymmetrical position between the lid parts so as to form two spaces of different size. The flat shape of the support plate on both sides gives an additional space saving on both sides of the support plate compared with the commercially available housing usual in practice, so that this feature in itself already renders it possible to accommodate not just a very thin leaflet, as in the known design, but a thin text booklet on either side between the mutually opposed retaining devices. Since the support plate is in addition positioned asymmetrically, two spaces of different size are created at the two sides of the support plate which may be utilized in different manners and which may be given different sizes depending on the position of the support plate. This construction accordingly renders it possible to position the space gained by the thinning of the support plate, i.e. by its flat shape, on the one or the other side of the support plate, as desired. The asymmetrical position of the support plate has become possible in that the support plate has a flat shape on both sides, in contrast to the commercially available box, which renders possible the additional space gain mentioned above.

A preferred embodiment of the invention is characterized by a position of the support plate such that, the smaller space being provided with two retaining devices, the ends of said retaining devices face one another immediately at a short distance. The support plate in this construction has accordingly been shifted towards the smaller space so far that the same conditions prevail in this small space as in the two spaces of the known, conventional construction. The small interspacing between the two retaining devices in the smaller space thus renders it possible, as in the known, conventional housing, to accommodate only a thin text leaflet, but not a thicker text booklet. Such a thicker text booklet could only be provided in the smaller space in this construction if one or both retaining devices were removed. Because of the asymmetrical position of the support plate, however, a thicker text booklet can also be accommodated in the larger space on the other side of the support plate even if both retaining devices are present in this space. An even thicker text booklet can be accommodated in the larger space, moreover, if one or both retaining devices were removed. The space saving in the larger compartment is based on the one hand on the flat shape of the support plate and on the other hand on its asymmetrical position in the housing. Such a position of the support plate thus renders possible a flexible use of the housing with a variable number of information carriers and a variable accommodation of text booklets of variable thickness. Four different embodiments of such a housing will be described below.

It is thus proposed in a first embodiment that both lid parts comprise a tray provided with a retaining device, and both sides of the support plate comprise a retaining device. This construction renders it possible to accommodate four disc-shaped information carriers and a text booklet in the larger space between the information carriers held there.

A second embodiment is characterized in that both lid parts comprise a tray provided with a retaining device, and the support plate has a retaining device only at the side of the smaller space. This construction renders it possible to accommodate three disc-shaped information carriers and a text booklet which may be thicker than in the preceding embodiment.

A third embodiment is characterized in that only the two lid parts each have a tray provided with a retaining device. Only two disc-shaped information carriers can be accommodated in this construction, as well as two text booklets which may be of different thicknesses.

In a fourth embodiment, finally, only the lid part of the smaller space contains a tray provided with a retaining device, and only the side of the support plate facing this lid part comprises a further retaining device. This construction renders possible the accommodation of two disc-shaped information carriers, as in the preceding embodiment, as well as at least one text booklet which may be thicker than all text booklets referred to above, since the larger space is now free from retaining devices.

This latest embodiment contains no tray which can be mounted in the lid part of the larger space, so that no information leaflet can be held such as is normally present between the snapped-home tray and the lid part. To provide for this, it is suggested in a further embodiment of the invention that the lid part bounding the larger space contains an insert provided with a side grip which is adapted to the exterior dimensions of a tray including the side grip thereof and which comprises a thin plate which is flat on both sides in the lid region. It is now possible to mount said insert in the lid part instead of the tray, which insert may be snapped home into the lid part, for example in exactly the same way as the tray, by means of lateral clamping elements. This also makes it possible to accommodate a simple information leaflet between the insert and the lid part, as is also the case with a normal tray. Since the thin plate of the insert occupies hardly any space and does not comprise a retaining device, the space available for the text booklet is substantially not reduced.

A further embodiment of the invention is characterized in that an adapter part adapted to the shape of the side grip of the tray is clamped in into the lid part bounding the larger space. An insert with a flat plate which can be snapped home into the lid part is absent in this embodiment, so that a text booklet present in the larger space can be viewed directly from the outside.

DESCRIPTION OF THE PREFERRED EMBODIMENTS

Figure 1:
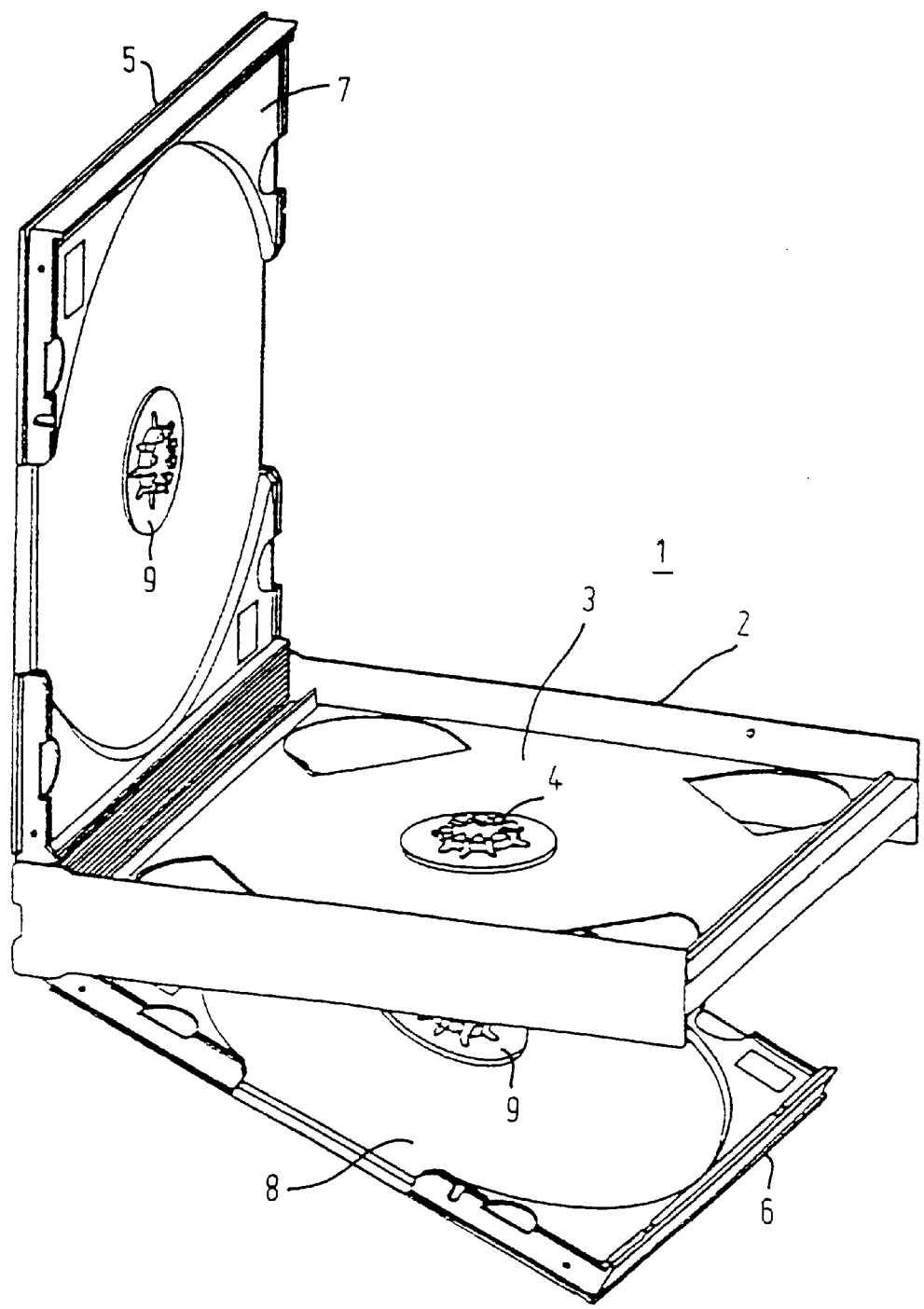
FIG. 1 is a prior art form of perspective view of a housing for accommodating several CDs, comprising a central part and two identical lid parts.

The known housing 1 of FIG. 1 comprises a central part 2 with a support plate 3 provided on both sides with a retaining device 4 for disc-shaped information carriers. The central part 2 is provided on both sides with hinged lid parts 5, 6 of identical construction into which trays 7, 8 are clamped in, which trays also comprise retaining devices 9.

The housing constructions according to the embodiments of the invention shown in FIGS. 2 to 5 differ from the prior art housing of FIG. 1 in that the central part is modified whereas the exterior dimensions and the lid parts are not changed.

Figure 2:
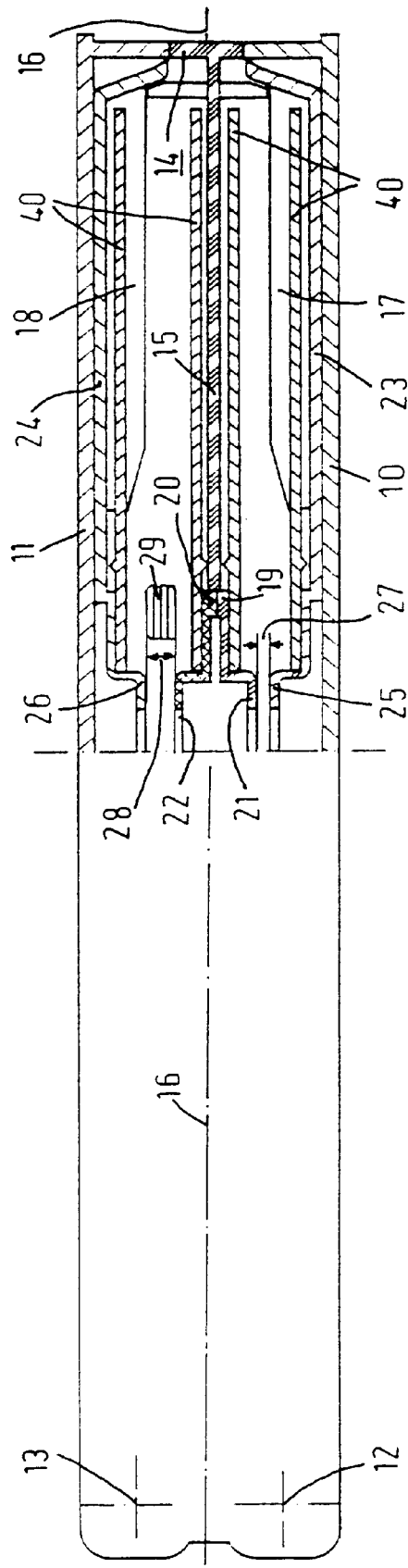
FIG. 2 is a cross-section of a first embodiment of a housing according to the invention, the right-hand portion only being shown in cross-section.

The embodiment of FIG. 2 has two identical lid parts 10, 11 which are hinged to a central part 14 at 12, 13. The central part 14 comprises a support plate 15 which is flat on both sides and which is shifted in downward direction relative to the plane of symmetry 16 of the housing. This asymmetrical position of the support plate 15 creates a smaller space 17 bounded by the lid part 10 and a larger space 18 bounded by the lid part 11. The support plate 15 in this embodiment has raised central supports 19, 20 each provided with a retaining device 21, 22, on its two sides.

A tray 23, 24 is clamped in into both lid parts 10, 11 and is provided with a respective retaining device 25, 26. An interspacing 27 is present in this construction between the retaining devices 21 and 25 in the smaller space 17 which is capable of accommodating at most a thin leaflet. By contrast, a comparatively great interspacing 28 is formed between the retaining devices 22 and 26 of the greater space, suitable for holding a thicker text booklet 29.

Figure 3:
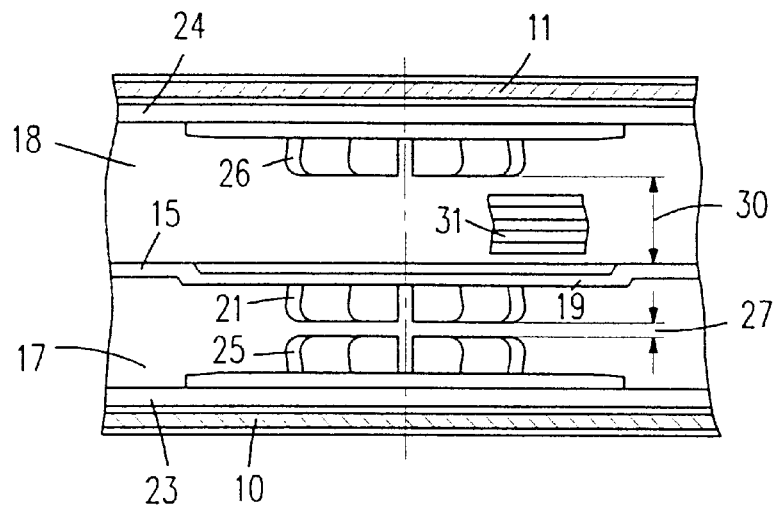
FIGS. 3 to 5 show cross-sections of the central regions of three further embodiments of a housing, according to the invention

The embodiment shown in FIG. 3 differs from that shown in FIG. 2 in that the support plate 15 in the larger space 18 has no retaining device, so that a free space 30 is created here suitable for holding an even thicker text booklet 31.

Figure 4:
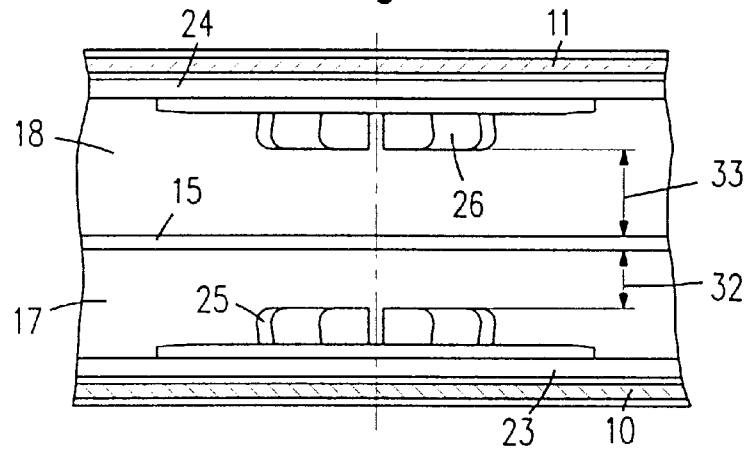

In the embodiment of FIG. 4, the support plate 15 has no retaining devices at all, so that a free space 32 is present in the smaller space 17 and a free space 33 in the larger space 18, suitable for accommodating text booklets of different thicknesses.

Figure 5:
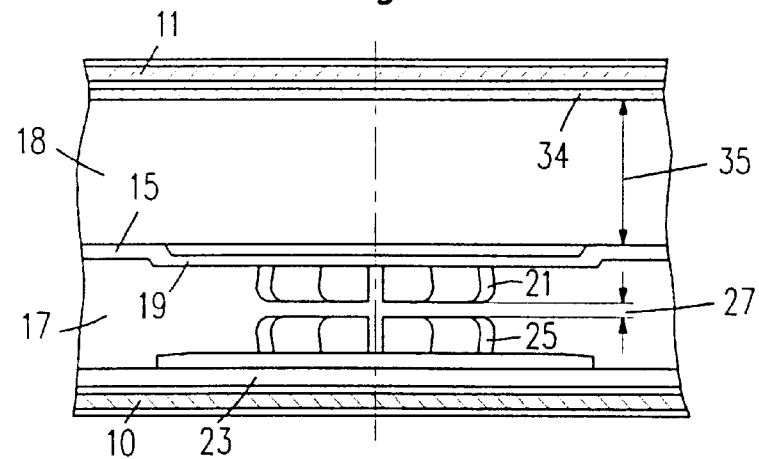

The embodiment of FIG. 5 differs from that of FIG. 2 in that the larger space 18 now contains no retaining devices, but only an insert 34 provided in the upper lid part 11. A free space 35 is created thereby which can hold an even thicker text booklet.

All embodiments of FIGS. 2 to 5 have the same exterior dimensions as the known embodiment of FIG. 1, as well as lid parts of the same construction.

Figure 6:
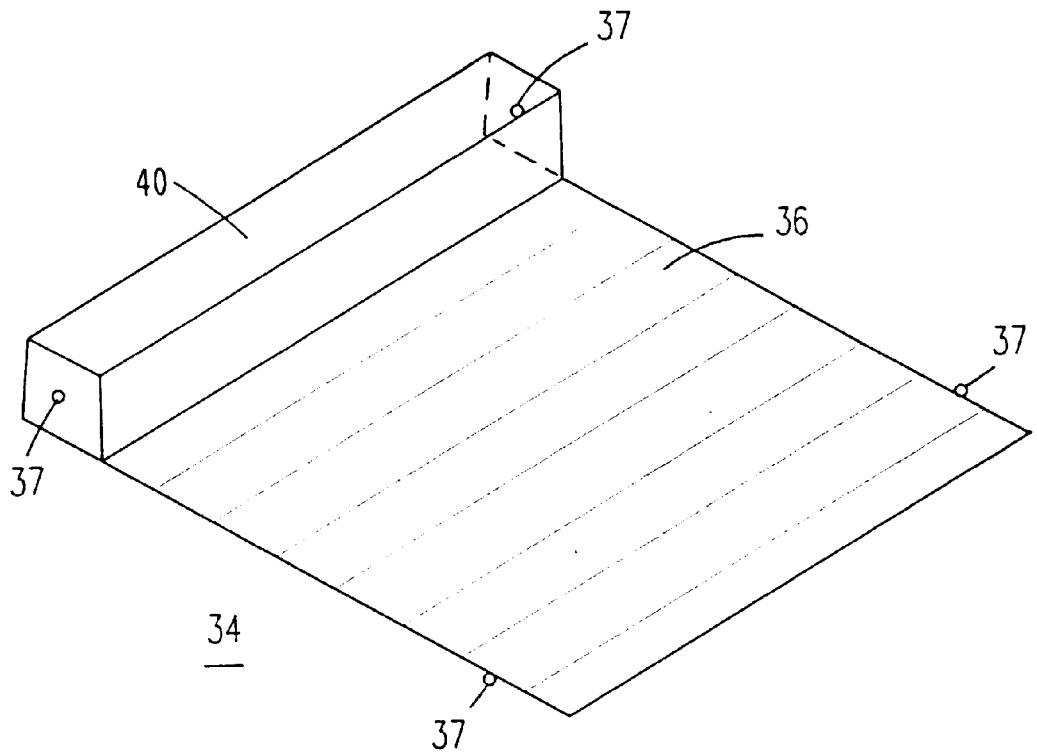
FIG. 6 shows an insert for the lid part of a housing according to the invention.

The insert 34 shown only partly and in cross-section in FIG. 5 is shown in perspective view in FIG. 6; it comprises a side grip 42 and a plate 36 which is flat on both sides and which can be snapped home into the lid part 11 by means of lateral clamping elements 37. This insert 34 has exterior dimensions equal to those of a usual tray, but it has no retaining device. It serves mainly to keep in place an information leaflet inserted between the flat plate 36 and the supporting plate 15.

Figure 7:
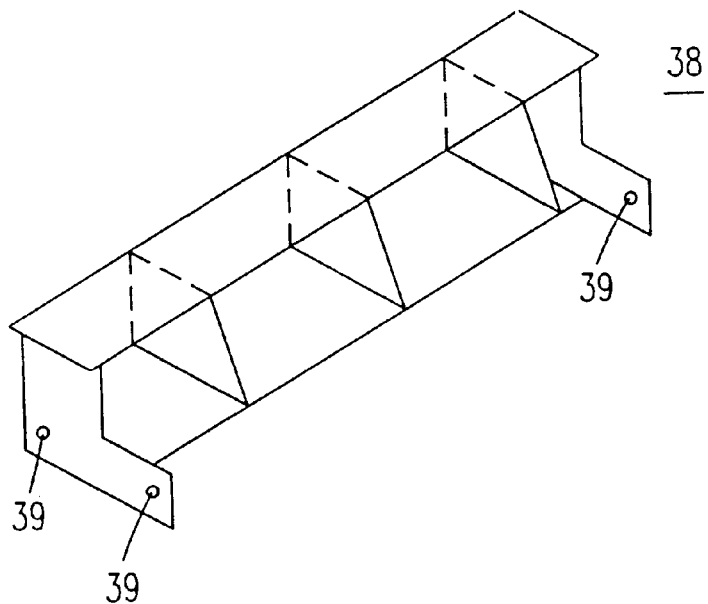
FIG. 7 shows an adapter to be inserted into the aforesaid lid part.

An adapter part 38 as shown in FIG. 7 may be used instead of the insert 34 of FIG. 6, which adapter part can also be snapped home into the lid part 11 with clamping elements 39, but which only occupies the space otherwise occupied by the side grip.

CDs accommodated in the housings of FIGS. 2 to 5 have the reference numeral 40.

We claim:

1. A housing for storing disc-shaped information carriers, comprising:

a central portion (14) to which is hinged two identical lid parts (10, 11) which when closed overlay opposite sides of said central portion (14);

a support plate (15) which is flat on both sides and comprised in said central portion (14) so as to lie between said lid parts (10, 11) when the lid parts are closed;

each of said lid parts being adapted to centrally support a respective retaining device (25, 26) on a surface thereof facing one side of said support plate, and said support plate being adapted to centrally support further retaining devices respectively on each side thereof;

said support plate extending asymmetrically between said lid parts (10, 11) so as to form two spaces (17, 18) of different sizes between each side of the support plate and the facing lid part surface, each of said spaces extending over substantially an entire side of said support plate.

2. A housing as claimed in claim 1, wherein the smaller (17) of said spaces includes two of said retaining devices (21, 25) and said devices are positioned so that end faces thereof face one another across a relatively small spacing therebetween.

3. A housing as claimed in claim 1, wherein said lid parts (10, 11) each comprise a respective tray (23, 24) on which a respective retaining device (25, 26) is supported, and each side of the support plate (15) has a respective retaining device (21, 22) supported thereon.

4. A housing as claimed in claim 1, wherein said lid parts (10, 11) each comprise a respective tray (23, 24) on which a respective retaining device (25, 26) is supported, and the support plate (15) has a retaining device (21) supported thereon only on the side thereof which adjoins the smaller (17) of said two spaces.

5. A housing as claimed in claim 1, wherein the lid parts (10, 11) each have a respective tray (23, 24) thereon on which a respective retaining device (25, 26) is supported and there are no retaining devices on said support plate.

6. A housing as claimed in claim 1, wherein only the lid part (10) which adjoins the smaller (17) of said two spaces includes a tray (23) on which a retaining device (25) is supported, and only the side of the support plate (15) which adjoins said smaller space (17) has a retaining device (21) supported thereon.

7. A housing as claimed in claim 6, wherein the lid part (11) which bounds the larger (18) of said two spaces contains an insert 34 having a side grip (40) and a thin plate (36) which is flat on both sides, said insert being manually controllable by said grip for inclusion in and removable from said lid part (11).

8. A housing as claimed in claim 6, wherein the lid part (11) which bounds the larger (18) of said two spaces contains an adapter part (38) which simulates an insert (34) for said lid part (11), said adapter part having dimensions matching corresponding dimensions of a side grip (40) of said insert (34).

\* \* \* \* \*